United States Patent Office

3,294,620
Patented Dec. 27, 1966

3,294,620
RESINS FROM ALIPHATIC AND CYCLOALIPHATIC DICARBOXYLIC ACID AND GLYCOL MIXTURES
John Christos Petropoulos, Norwalk, Robert Saxon, Stamford, and James Sterling Noland, Greenwich, Conn., assignors to Formica Corporation, Cincinnati, Ohio, a corporation of Delaware
No Drawing. Filed Apr. 3, 1963, Ser. No. 270,180
7 Claims. (Cl. 161—232)

This invention relates to a novel, self-cross-linking, normally solid, non-crystalline polyester resin composition prepared by esterifying (1) from about 34–49 mol percent of a cycloaliphatic dihydric alcohol, (2) from about 1–16 mol percent of an asymmetrical, linear aliphatic dihydric alcohol, (3) from about 30–49 mol percent of an $\alpha,\beta$-ethylenically unsaturated dicarboxylic acid selected from the group consisting of fumaric acid and itaconic acid and (4) from about 1–20 mol percent of a cycloaliphatic dicarboxylic acid, wherein the total mol percent of all components is 100%. Still further, this invention relates to decorative laminates having good light stability and hydrolytic stability comprising a base member having bonded thereto a decorative overlay or print sheet impregnated with the polyester resins of the present invention wherein said polyester resin in its cured state is self-cross-linked.

One of the objects of the present invention is to produce a polyester resin composition which is capable of cross-linking with itself without benefit of a polymerizable cross-linking monomer. A further object of the present invention is to produce a normally solid, non-crystalline, self-cross-linking polyester resin which can be used in a laminated structure for use in either indoor or outdoor applications and having significant ultraviolet light stability and hydrolytic stability. These and other objects of the present invention will be discussed in greater detail hereinbelow.

Decorative laminates have long been known in the art for use in table tops, counter tops, panelings and the like. Nothwithstanding the tremendous public acceptance of these laminated structures, for certain purposes, particularly outdoor exposition, improvements have been required so as to produce a product which will be stable against the deteriorating defects of crazing, cracking, discoloration and the like, when exposed to the elements, such as the heat of the summer, the cold of the winter and the extremes of humidity from very dry to exceedingly moist. Many of the known resinous materials that have been used successfully in the manufacture of decorative laminates fail in one regard or another in the severe tests to which outdoor laminates must be subjected in a simulation of actual weathering conditions.

We have discovered a novel polyester resin composition which can be used in the manufacture of a structural laminate and more particularly a decorative structural laminate which is capable of withstanding the rigors of extreme weathering conditions without significant perceptible deterioration. In order to achieve this result, a particular polyester resin composition having four essential components with interdependent mole percent proportions has been devised which can be used very successfully for this purpose.

The first component is one of two dihydric alcohols used in the polyester resin composition and is classed as a cycloaliphatic dihydric alcohol. The amount of the cycloaliphatic dihydric alcohol which may be used may be varied between about 34–49 mol percent, based on the total mols used in the polyester resin composition. Illustrative of these cycloaliphatic dihydric alcohols are cyclohexanediol-1,2; cyclohexanediol-1,3; cyclohexanediol-1,4; cyclohexanedimethanol-1,2; cyclohexanedimethanol-1,3; cyclohexanedimethanol-1,4; cyclohexanediethanol-1,4; hydrogenated bis-phenol A further identified as isopropylidinebis(p-hydroxycyclohexane) and the like. The hydroxy groups in the hydrogenated bisphenol A are generally in the p,p' position when secured from commercial sources. Additionally, one may use the hydrogenated bisphenols such as those disclosed in the U.S. Patent 2,118,954. These cycloaliphatic dihydric alcohols may be used either singly or in combination with one another in the compositions of the present invention but the requirement with respect to the mol percent ratio is still applicable whether one or more cycloaliphatic dihydric alcohols are used.

The second component of the polyester resin composition of the present invention is an asymmetrical linear aliphatic dihydric alcohol. The amount of the asymmetrical dihydric alcohol used in the composition of the present invention may be varied from about 1 to about 16 mol percent, based on the total mols in the composition. Illustrative of the asymmetrical linear aliphatic dihydric alcohols which may be used are 1,3-butylene glycol, 1,2-butylene glycol, pentanediol-1,2, pentanediol-1,3, pentanediol-1,4, hexanediol-1,3, hexanediol-1,5, octanediol-1,6, octanediol-2,5 and the like. These asymmetrical dihydric alcohols may be used either singly or in combination with one another but the proportion requirement remains the same in either event.

The third component used in the composition of the present invention is an $\alpha,\beta$-ethylenically unsaturated dicarboxylic acid selected from the group consisting of fumaric acid and itaconic acid. The amount of these unsaturated dicarboxylic acids which may be used can be varied between about 30 and 49 mol percent, based on the total mols used in the composition. These acids may be used either separately or in combination with one another and the proportion requirement remains the same. However, when itaconic acid is used as the $\alpha,\beta$-ethylenically unsaturated dicarboxylic acid, the measure of the asymmetrical dihydric alcohol may be diminished proportionately, if desired, since itaconic acid is in itself asymmetrical and it is the lack of symmetry in the glycol and/or in the itaconic acid which aids in producing the non-crystalline characteristic in the polyester resin composition of the present invention.

The fourth component used in the composition of the present invention is a cycloaliphatic dicarboxylic acid. This acid may be present in amounts varying between about 1 and 20 mol percent, based on the total mols in the composition. Among the cycloaliphatic dicarboxylic acids which may be used in the present invention are hexahydroorthophthalic acid, hexahydrometaphthalic acid, hexahydroparaphthalic acid, and the like. These and comparable acids may be used either singly or in combination with one another but the mol percent range still prevails whether used singly or jointly.

It is to be noted that the total amount of the first two components, namely, the two dihydric alcohol materials, should total approximaely 50 mol percent in the ultimate polyester resin composition produced. Analogously, the two dicarboxylic acid components should total approximately 50 mol percent, based on the total composition. The total of the various four components should, of course, add up to 100%. In the preparation of the composition of the present invention, it will be desirable to use a small excess amounting to about 5 or 10% of the dihydric alcohol components, based on stoichiometrical calculations required to achieve substantially complete esterification but the excess dihydric alcohol materials used remains unreacted at the completion of the process and do not enter into the final composition and are preferably stripped off to yield a normally solid, non-crystalline, self-cross-linkable polyester resin composition.

The term "self-cross-linkable" as used in this description of the instant invention refers to the capability of the unsaturated polyester resins to cross-link with themselves without benefit of a cross-linking monomer such as styrene, methyl methacrylate, diallylphthalate and the like. It obviously does not preclude the use of a free radial producing catalyst such as those described elsewhere herein since it is desired to make use of such catalyst to facilitate the cross-linking of these polyester resin compositions.

Although the unsaturated polyester resins of the present invention can be and preferably are used without benefit of a polymerizable monomer for outdoor vertical laminate purposes, one could utilitize any of the conventional cross-linking agents used generally with unsaturated polyester resins for purposes other than outdoor vertical laminate purposes. Among the polymerizable monomers frequently used in this connection with the unsaturated polyester resins generally are styrene, ring-substituted alkyl and halo styrenes, and allyl monomers such as diallyl maleate, diallyl phthalate, triallyl cyanurate and the like. Since this approach is well known in the art it is deemed sufficient to make reference to the U.S. Patents 2,255,313; 2,443,735—41, inclusive, and 2,510,503; and 2,510,564 and to incorporate the same herein by reference.

In utilizing the non-crystalline normally-solid self cross-linkable polyester resins of the present invention in the preparation of a laminate one would dissolve the polyester resin in a suitable inert organic solvent such as benzene, toluene, xylene, chloroform, ethylene dichloride, trichloroethylene, nitromethane, dimthylformamide and the like. Once dissolved in these solvents, the solution may be utilized by addition thereto, just prior to use, of catalytic quantities of conventional peroxide catalyst normally used for this general purpose. Included in the group of catalysts suitable for this purpose are benzoyl peroxide, tertiary butyl hydroperoxide, ditertiary butyl peroxide, cumene hydroperoxide, 1-hydroxy cyclohexyl peroxide-1 and the like. For exterior use aliphatic peroxides are preferred. Combinations of catalysts and accelerators can be used if desired. The amount of catalyst used may be varied from about 0.1% and 10% by weight based on the total weight of the resin solids and preferably between about 1 and 3%, same basis. The use of a catalyst can be avoided by using thermopolymerization conditions but best results are achieved by the combination of thermal and catalytic conditions.

In preparing the laminate, the catalyzed resin solution can be used to impregnate the fibrous sheet material, whether decorated or not, followed by the evaporation of the inert organic solvent from the sheet preparatory to the laminating operation. The fibrous sheet material may be any one of a plurality of conventionally available materials for this purpose such as cellulosic sheet material, polyester fiber sheet material, fibrillated polyacrylonitrile fibrous sheet material and the like. If desired these sheets or papers may be pre-impregnated with a resinous material such as a melamine-formaldehyde resin and then coated or impregnated with the unsaturated polyester resins of the present invention or these polyester resins may be used directly on the sheet material without benefit of any pre-impregnation step.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with stirrer, thermometer, temperature controller, gas inlet tube (below the liquid surface), and a gas exit tube fitted with a steam condenser, there is introduced 247 parts of 1,3-butylene glycol, 792 parts of 1,4-cyclohexanedimethanol, 580 parts of fumaric acid, 385 parts of hexahydrophthalic anhydride and 2 parts of tertiary butyl catechol. The reactants are blanketed with a carbon dioxide atmosphere (200–300 cc./minute) and heated with constant stirring to about 195–200° C. until an acid number of about 15 is reached. The condenser is then removed and the inert gas rate is increased to about 10 liters/minute in order to remove the excess glycol. The sparging is continued until a sample of the resin has a hardness value of 38–40, as measured at 25° C. with a Barcol Model 936 "Impressor." The final acid number is 10.8. The finished resin is cooled to 170° C. and poured with stirring into sufficient toluene so as to prepare a 70% resin solids solution. Alternatively, the neat resin is poured directly into an aluminum tray and cooled to room temperature. The cooled resin in a glassy solid which is non-sticky to the touch but with a tendency to cold-flow.

*Example 2*

Into a suitable reaction vessel equipped as before there is introduced 54.9 parts of 1,3-butylene glycol, 190.2 parts of 1,4-cyclohexanedimethanol, 132.2 parts of fumaric acid, 87.7 parts of hexahydrophthalic anhydride and 0.45 part of tertiary butyl catechol. The procedure outlined in Example 1 was followed in all details except that the batch was heated at about 205° C. for about 20 hours under a blanket of nitrogen, introduced at a rate of 50 ft.³/hour. At the end of the 20 hour cook cycle, the acid number of the resin was about 15 and the Barcol Model 936 hardness was 40 at 25° C. without requiring the final sparging step. The finished resin, in a 30% solids solution in dimethyl phthalate, has a Gardner-Holdt viscosity of U–V at 25° C., and the color is 1 on the Gardner color 1933 scale. The resin is drawn hot (180° C.) into a second stirred kettle containing sufficient toluene to prepare a 70% solids solution which may then be further diluted to any desirable solids concentration.

*Example 3*

Into a suitable reaction vessel equipped as before, there is introduced 1585 parts of 1,4-cyclohexanedimethanol, 198 parts of 1,3-butylene glycol, 696 parts of fumaric acid, 616 parts of hexahydrophthalic anhydride, 262 parts of itaconic acid and 3 parts of tertiary butyl catechol. The batch is heated to 200° C. under a nitrogen blanket maintained at a rate of 300 cc./minute for a 21 hour period. At that time, the acid number of the resin is 12 and the Barcol hardness is 42 at 25° C. The resin is a yellow solid but when cured as shown in greater detail hereinbelow is colorless, transparent and hard-surfaced.

*Comparative Example 4*

Into a suitable reaction vessel equipped as before there is introduced 158 parts of 1,4-cyclohexanedimethanol, 99 parts of 1,3-butylene glycol and 232 parts of fumaric acid. This charge is heated with constant stirring for 16 hours at 190° C. in an inert atmosphere at which time the acid number is 17.5. The resin thus produced is a solid glass at room temperature but was not suitable for laminate preparation because of the brittleness of the cured resin. This will be shown in greater detail hereinbelow.

*Example 5*

250 parts of a 40% solids solution of the resin prepared according to Example 1 in toluene is catalyzed by the addition of 1.33 parts of 2,5-dimethyl-2,5-di(tertiary-butylperoxy)hexane, 0.67 part of tertiary butyl hydroperoxide and 0.0167 part of cobalt as cobalt naphthenate. The catalyzed resin solution is placed in a treater vessel and sheets of 66 lb. machine-calendered fibrillated acrylic fiber sheet printed with a dark wood grain are impregnated by a single pass through the resin solution. The impregnated sheets are dried on a horizontal frame at 113° C. for 10 minutes. The dried sheets, containing about 45% resin, are then given a top surface coat of a 50% solids solution of the polyester resin of Example 1 dissolved in toluene and catalyzed with 1.43% of 2,5-dimethyl-2,5-di(I-butylperoxy)hexane, 0.57% of tertiary butyl hydroperoxide and 0.0143% of cobalt as cobalt naphthenate. The coated, impregnated sheets are further dried and advanced for about 9 minutes at 113° C. The total resin pick-up is about 59% by weight. The dried acrylic fiber sheet impregnated with the partially cured polyester resin is laminated at 600 p.s.i. and 160° C. for 30 minutes directly onto a previously sized ⅛ inch thick cement-asbestos board. The asbestos board was pre-sized by washing the surface thereof with a 5% hydrochloric acid solution followed by treatment with a dilute solution (5–10% solids) of the catalyzed polyester resin so as to permit the resin to enter the porous surface of the asbestos board. The bond produced by this laminating procedure withstood 2 hours' immersion in boiling water without delamination. The appearance of the sample was unchanged after 1500 hours exposure in an accelerated weathering device. The resulting laminate is an attractive, rigid panel suitable for use in an exterior building application.

*Example 6*

A standard cellulosic fiber print sheet is impregnated with about 40–45% resin solids of a melamine-formaldehyde resin in a manner conventionally known in the art. Three impregnated cellulosic print sheets are then coated with a 50% solids solution of one of each of the polyester resins shown in Examples 1, 2 and 3, separately, each of these polyester resins having been previously catalyzed with 2% of tertiary butyl perbenzoate. The resin-coated paper is dried and the cure advanced by heating for about 5 minutes at about 120° C. The dry resin pick-up is about 12 grams per square foot. The print sheet thus produced is laminated as the top layer over 8 sheets of phenolic resin-impregnated kraft paper at 1100 p.s.i., 160° C. for 30 minutes between polished chrome-finished platens. The resulting laminate has a hard, glossy film of about 2–3 mils thickness. The pencil hardness is 3-H and the Armstrong abrasion test with a 30 lb. load, No. 400 paper, abraded 0.28 cc./100 cycles.

*Example 7*

A 90 lb. cellulosic fiber print sheet is impregnated with a 30% solids solution of the polyester resin of Example 1 dissolved in 1,2-dichloroethane, catalyzed with 1.33% of 2,5-dimethyl-2,5-di(T-butylperoxy)hexane, 0.67% of tertiary butyl hydroperoxide and 0.0167% of cobalt as cobalt naphthenate, all percentages by weight, based on the weight of the resin solids. The thus impregnated sheet has about a 50% resin content and the sheet is dried at about 113° C. for 10 minutes. The sheet is then given a clear top coat of the resin of Example 2 in a quantity sufficient to leave a dry surface film of about 5–7 grams/ft.² and is again dried for 10 minutes at 113° C. The dried, partially cured resin-coated sheet is laminated over a phenolic adhesive sheet onto a ⅛-inch cement-asbestos board as in Example 5. In this instance, the cement-asbestos board had previously been sized with a 30% solution of an epoxy resin dissolved in acetone. Said epoxy resin contains an 80% equivalent of n-phenylene diamine. The laminating conditions were 1100 p.s.i., 160° C. for 30 minutes. The resulting laminate was unchanged in appearance after 1000 hours exposure in a fluorescent ultraviolet accelerated weathering device.

The particular suitability of the polyesters, prepared according to our invention, for exterior application is illustrated by their resistance to yellowing when exposed to ultraviolet radiation in accelerated weathering devices. Conventional unsaturated polyesters, which require a comonomer such as styrene, diallyl phthalate, methyl methacrylate, etc., for curing purposes, yellow objectionably when not protected by addition of efficient ultraviolet absorbers. Consequently, the stability of those resins is essentially that inherent in the effectiveness and longevity of the ultraviolet absorber. The polyesters prepared by the present invention have hardly perceptible yellowing. E values (*see note below) for 1000 hours exposure in a fluorescent ultraviolet weathering device range from 0.2 to 0.6 unit for an unsupported, transparent film of 6 mil thickness to values of 0.2–1.9 units for the laminated surfaces as disclosed herein, dependent upon the color of the substrate. In contrast, the color development in surfaces of similar thickness prepared with conventional unsaturated polyesters were much higher. A resin composed of 70% by weight of a polyester composed of 2 parts 1,2-propylene glycol, 1 part phthalic acid and 1 part maleic acid, plus 30% by weight of styrene had a $E_{1000\ hr.}$ value of 10.2. Similarly, a resin prepared from 56% by weight of a polyester of 2 parts 1,3-butylene glycol, 1 part succinic acid, and 1 part maleic and, 17.6% styrene, 25% methyl methacrylate, and 1.4% ethylene bis-methacrylate had an $E_{1000}$ value of 6.5 units.

The use of weather resistant components, as disclosed in the list of suitable acids and glycols, for the polyester without removing the requirement for a comonomer like styrene is not a sufficient condition to prepare weather resistant laminates. A case in point is the resin prepared from 1 part hexahydrophthalic acid, 1 part maleic and, 2 parts 1,3-butylene glycol. A casting of this particular resin cross-linked with 30% by weight of styrene had an $E_{1000}$ value of 15.4 units.

Specifications for the L, a, b convention and its relation to other tristimulus color responses are in ASTM procedures D 1365–55T, D 1482–57T, D 1495–57T, and D 1536–58T.

These reported measurements were made by comparing the exposed samples to a standard and read directly from the Gardner Automatic Color Difference meter, or, alternatively, from measurements of either absorption or reflectance ultraviolet spectra, and conversion to L, a,b values according to the ASTM procedure.

*Example 8*

A laminate is prepared in a manner identical with that described in Example 6, with the exception that the polyester resin described in comparative Example 4 is used. The resulting laminate has a hard, transparent surface, but the surface becomes severely cracked when subjected to sharp temperature change or flexural strain which precludes its use in a practical surfacing application.

*Example 9*

The cellulosic fiber sheet, impregnated with a melamine-formaldehyde resin, and surfaced with a uniform coating of the subject polyester resin, in the manner disclosed in Example 6, is laminated over a single phenolic adhesive sheet directly onto a ⅛″ cement-asbestos product which had been sized with an adhesive formulation as in Example 7. The laminating conditions are 1100 p.s.i., 1550, for 30 minutes.

*Example 10*

An unpigmented, calendered, fibrillated polyacrylonitrile fiber sheet, of sufficiently light weight for an "overlay" application, i.e., about 20–25 lb. is treated

---

*$E_{1000}$ refers to the color change observed after accelerated weathering tests of 1000 hour duration in a fluorescent ultraviolet weather device, where E, the color change, is expressed as a function of three parameters:

$$E=[(\Delta L)^2+(\Delta a)^2+(\Delta b)^2]^{1/2}$$

where:
  $\Delta L$ expresses change in grayness on a scale from black (0) to white (100).
  $\pm(\Delta a)$ expresses color from green (−80) to red (+100).
  $\pm(\Delta b)$ expresses color from blue (−90) to yellow (+70).

with a solution of 60% resin in toluene of the polyester, prepared according to Example 1, catalyzed with 2% (by weight, on resin solids) of t-butyl perbenzoate, and dried at 130° for five minutes. The dried advanced sheet, which contains 70% resin, is transparent. It is laminated over a standard cellulosic melamine-formaldehyde sheet, a phenolic adhesive sheet, and a ⅛″ cement asbestos board sized with an adhesive as in Example 7, at 400 p.s.i., 150°, for 30 minutes. The resulting laminate has an E value of 1.7 units after 1200 hours' exposure in the fluorescent ultraviolet device for artificial weathering.

We claim:

1. A self-cross-linkable, normally solid, non-crystalline polyester resin composition consisting essentially of the esterification product of
    (A) from about 34 to 49 mol percent of a cycloaliphatic dihydric alcohol having one ring of 6 carbon atoms,
    (B) from about 1 to 16 mol percent of an asymmetrical, linear aliphatic dihydric alcohol,
    (C) from about 30 to 49 mol percent of an $\alpha,\beta$-ethylenically unsaturated dicarboxylic acid selected from the group consisting of fumaric acid and itaconic acid and
    (D) from about 1 to 20 mol percent of a cycloaliphatic dicarboxylic acid having one ring of 6 carbon atoms, wherein the total mol percent of all components is 100%.

2. The composition of claim 1 wherein the cycloaliphatic dihydric alcohol is 1,4-cyclohexane dimethanol.

3. The composition according to claim 1 wherein the cycloaliphatic dihydric alcohol is cyclohexane-diol-1,4.

4. The composition according to claim 1 wherein the asymmetrical glycol is 1,3-butylene glycol.

5. The composition according to claim 1 wherein the $\alpha,\beta$-ethylenically unsaturated dicarboxylic acid is fumaric acid.

6. The composition according to claim 1 wherein the cycloaliphatic dicarboxylic acid is hexahydrophthalic acid.

7. A laminated structure comprising a base member onto which is bonded a decorative support sheet impregnated with a self-cross-linked, normally solid, non-crystalline polyester resin composition consisting essentially of the esterification product of
    (A) from about 34 to 49 mol percent of a cycloaliphatic dihydric alcohol having one ring of 6 carbon atoms,
    (B) from about 1 to 16 mol percent of an asymmetrical, linear aliphatic dihydric alcohol,
    (C) from about 30 to 49 mol percent of an $\alpha,\beta$-ethylenically unsaturated dicarboxylic acid selected from the group consisting of fumaric acid and itaconic acid and
    (D) from about 1 to 20 mol percent of a cycloaliphatic dicarboxylic acid having one ring of 6 carbon atoms, wherein the total mol percent of all components is 100%.

References Cited by the Examiner

UNITED STATES PATENTS

| | | | |
|---|---|---|---|
| 2,828,278 | 3/1958 | Kosmin | 260—75 |
| 2,856,375 | 10/1958 | Mikeska | 260—75 |
| 2,967,854 | 1/1961 | Burrop | 260—75 |

WILLIAM H. SHORT, *Primary Examiner.*

R. LYON, *Assistant Examiner.*